No. 757,706.

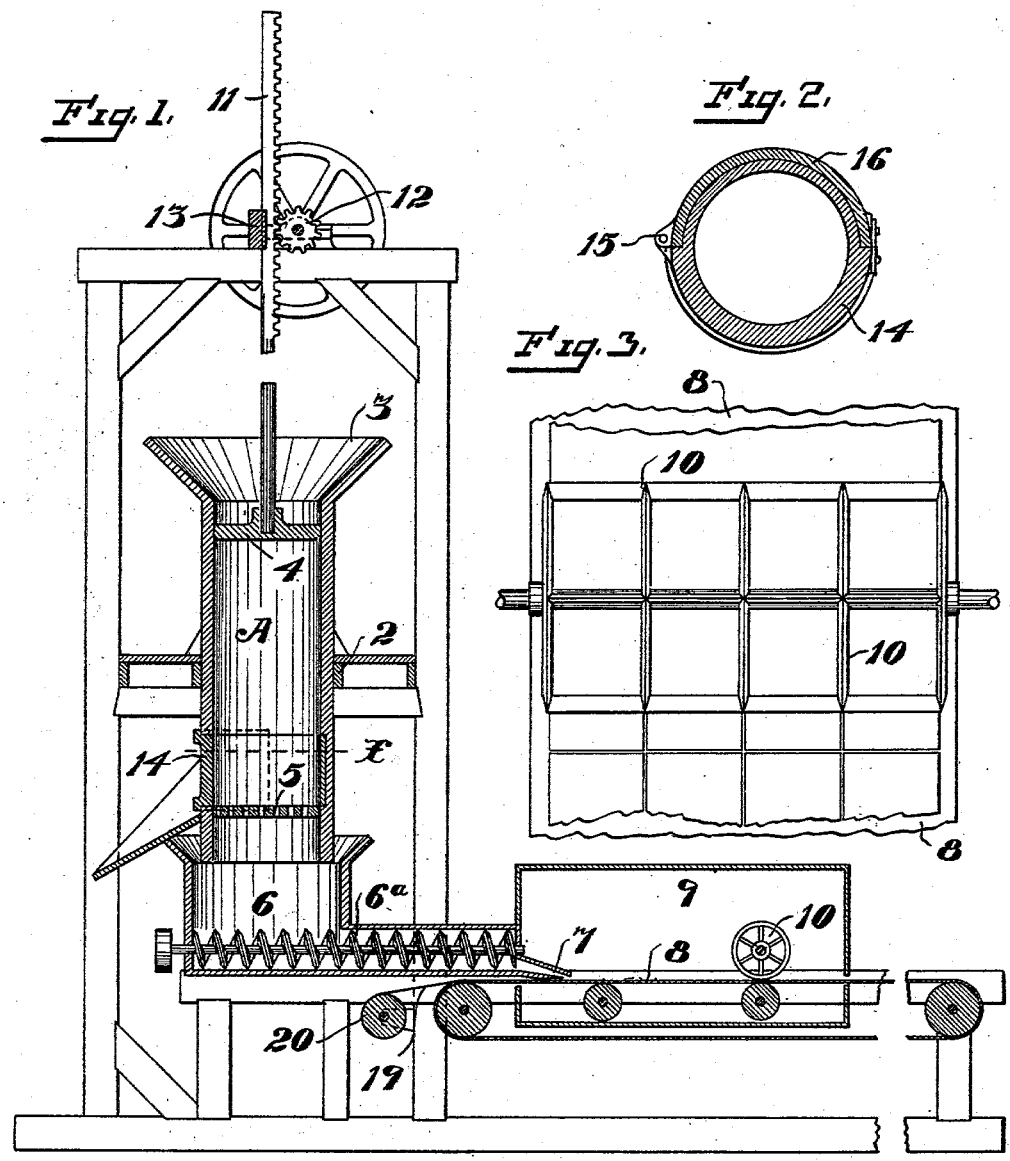

Patented April 19, 1904.

UNITED STATES PATENT OFFICE.

CHARLES R. WILSON, OF SAN FRANCISCO, CALIFORNIA.

PROCESS OF TREATING FRUITS.

SPECIFICATION forming part of Letters Patent No. 757,706, dated April 19, 1904.

Application filed October 13, 1903. Serial No. 176,835. (No specimens.)

*To all whom it may concern:*

Be it known that I, CHARLES R. WILSON, a citizen of the United States, residing in the city and county of San Francisco and State of California, have invented new and useful Improvements in Processes of Treating Fruits, of which the following is a specification.

My invention relates to an improved process of treating and preserving fruit.

It is well known that immense quantities of fruit go to waste annually, for the reason that it is too ripe either for shipment, preserving purposes, or drying under the methods ordinarily in vogue. In order to stand shipment, the fruit must be picked before it becomes ripe. It must be handled carefully, so as not to be bruised, else it will spoil before it reaches market. The canneries require hard perfectly-formed fruit that will retain its shape in the preserving process, since the public demand is regulated by the appearance of the product, and if soft or ripe fruit is used it "cooks up" in the preparation and is less pleasing to the eye, and, similarly, fruit prepared by hand for drying must be comparatively hard to withstand the necessary handling. Thus the best product of the orchard in great measure is cast aside as having no merchantable value.

The object of my invention is to provide means for utilizing this ordinarily worthless surplus by forming an attractive and durable product therefrom.

It consists, essentially, in subjecting the fruit to be treated to pressure to express the pulp and juice separate from the skins and pits, spreading the expressed material in a thin broad sheet upon some suitable non-adhesive surface, cutting the sheet into squares or other suitable designs, and finally drying the spread and cut product.

The process may be carried on by any suitable apparatus. In the present instance I have shown a convenient form of machine in which, having reference to the accompanying drawings, Figure 1 is a longitudinal central section of my invention. Fig. 2 is a transverse section on line *x x*, Fig. 1. Fig. 3 is an enlarged plan view of cutting-carrier.

A represents a vertically-disposed press-box, here shown in the form of a cylinder, supported in the framework 2. Material is fed into the cylinder through a suitable hopper 3. The material is compressed by means of a plunger or follower 4 and is discharged from the cylinder in the form of pulp through the perforations in the bottom plate 5. The latter serves as a strainer to remove the pits, stones, &c. It is made removable, so that plates having perforations of different sizes may be used, according to the fruit to be crushed. This crushed product is received from the cylinder into a chamber 6, whence it is discharged under pressure of the screw conveyers $6^a$ in a thin continuous sheet through a slot 7 upon an endless carrier 8. Inasmuch as the operation of the follower 4 is intermittent, while it is desired to have the operation of spreading and discharging upon the carrier continuous, accounts for the interposition of the auger $6^a$ or other suitable equivalent expressing mechanism. Carrier 8 passes through a sulfur-chamber 9, wherein the fruit is subjected to the usual bleaching process. In some instances it may be desired to omit sulfuring, in which case the chamber 9 could be dispensed with. Disposed transversely to carrier 8 is a roller having the radial cutters 10 engaging the upper surface of the traveling carrier and adapted to cut the fruit-strip into convenient squares conducive to the more ready handling of the product. The squares of fruit may be then removed and dried. As a result of such treatment fruit that has heretofore not been considered as having a market value may be converted into a high-class merchantable article. Fruit of any and all sizes or at any stage of maturity, windfalls, as well as the most carefully-picked and perfect fruit, may be made use of. The dried product having already been reduced to a pulp requires little cooking to render it digestible. Being free from skins and seeds or pits and retaining all the original juices, it is useful for confectionery purposes.

Any suitable means may be employed to reciprocate the follower 4. In the present instance I have shown it connected to a rack-bar 11, engaging a pinion 12 on a shaft receiving power from any appropriate source. The shaft is revolved alternately in one direction and the other to press the follower down to crush the fruit and to retract the follower. Suitable guides, as 13, maintain the engagement of the bar 11 with pinion 12. This construction affords a simple means of exerting great pressure on the fruit by the follower. After the pulp has been squeezed through the holes in plate 5 and the follower retracted the stones, pits, seeds, or other refuse matter remaining in the press-box are removed through and by means of a door 14. This door consists, essentially, of a hinged section movable into and out of an aperture in the side of the press-box and having its inner surface (when the section is in closed position) continuous with the inner surface of the press-box, forming, in fact, a part thereof and serving as a container for the residue of the fruit after the follower has completed compression. Specifically, it is here shown as comprising a cylindrical section having an interior diameter equal to that of the body of cylinder A. The latter has a segment of one hundred and eighty degrees or greater cut out adjacent to the bottom, and the door-section 14 is hinged at one edge of this opening, as at 15. The remaining segment 16 of cylinder A is cut out to afford a countersink for cylinder 14 when the latter is turned into position to bring its inner surface coincident with the upper portion of the bore of cylinder A. The side of the door corresponding to the cut-out portion of cylinder A is reinforced, as shown in Fig. 2, while the reduced portion fitting within cyilnder A is supported by the latter against the force of compression. When the door is closed, the parts are as a rigid unitary structure. Any suitable locking means may be provided to hold the door in closed position within cylinder A.

In order to facilitate the removal of the pulp from the carrier and to prevent the pulp adhering thereto, I may interpose a sheet of oil-paper or other suitable material between the carrier and the incumbent pulp. In the present instance I have shown a continuous sheet of paper, as 19, wound upon a roller 20 at the head end of the carrier, and the end of the sheet passed beneath chamber 6 over the surface of the carrier and beneath cutters 10. The weight of the pulp upon the paper causes the latter to be drawn along with the carrier.

Having thus described my invention, what I claim, and desire to secure by Letters Patent, is—

1. The herein-described process of treating fresh drupaceous fruits which consists in first subjecting the fresh fruit to pressure to express the pulp and juice and collecting the same separate from the skins and pits, then spreading the separated pulp and juice in a thin sheet-like form, and finally drying the sheet whereby the resultant product is a dried cake composed entirely of the pulp of raw fruit.

2. The herein-described process of treating fresh drupaceous fruits, which consists in first subjecting the fruit to pressure to express the pulp and juice and collecting the same separate from the skins and pits, then spreading the pulp and juices and delivering the same in a sheet-like form, bleaching the expressed pulp, subdividing the sheet, and finally drying the subdivided product whereby the resultant product is a cake composed of dried raw fruit-pulp.

In testimony whereof I have hereunto set my hand in presence of two subscribing witnesses.

CHARLES R. WILSON.

Witnesses:
 CHAS. T. STANLEY,
 A. H. MERRILL.